(12) United States Patent
Openlander

(10) Patent No.: US 7,405,382 B2
(45) Date of Patent: Jul. 29, 2008

(54) SYSTEM FOR MICROWAVE ENHANCED CHEMISTRY

(76) Inventor: Wayne Openlander, 2909C N. Wolcott, Chicago, IL (US) 60657

( * ) Notice: Subject to any disclaimer, the term of this patent is extended or adjusted under 35 U.S.C. 154(b) by 430 days.

(21) Appl. No.: 10/118,308

(22) Filed: Apr. 8, 2002

(65) Prior Publication Data

US 2004/0045957 A1    Mar. 11, 2004

(51) Int. Cl.
*H05B 6/68* (2006.01)
*H05B 6/80* (2006.01)

(52) U.S. Cl. .............. 219/715; 219/716; 219/696; 219/750; 219/760; 219/761; 204/157.15; 315/39.51

(58) Field of Classification Search ......... 219/715–721, 219/695–697, 760–761, 746–750; 204/157.15, 204/157.43; 315/39.51–39.55, 171
See application file for complete search history.

(56) References Cited

U.S. PATENT DOCUMENTS

| | | | | |
|---|---|---|---|---|
| 2,738,406 A | * | 3/1956 | Zaleski | 219/745 |
| 3,417,343 A | * | 12/1968 | Kenny | 331/87 |
| 3,514,566 A | * | 5/1970 | Ironfield | 219/760 |
| 3,876,956 A | * | 4/1975 | Levinson | 331/71 |
| 4,017,702 A | * | 4/1977 | Harmon et al. | 219/715 |
| 4,931,609 A | * | 6/1990 | Aoki | 219/716 |
| 6,294,772 B1 | * | 9/2001 | Greene et al. | 219/679 |

FOREIGN PATENT DOCUMENTS

DE    2 062 646    *    7/1977

* cited by examiner

*Primary Examiner*—Philip H Leung
(74) *Attorney, Agent, or Firm*—Breffni Baggot

(57) ABSTRACT

According to the present invention, a microwave generator includes a variable voltage provided from a first transformer to a second transformer having a secondary winding split into a filament winding cathode low AC signal and a secondary winding providing a high voltage which is doubled and rectified in a half-wave voltage doubler for providing a pulsed DC signal through a ballast resistor to a magnetron anode responsive to an electromagnetic field. In still further accord with the present invention, a microwave sample cavity includes a waveguide, and a hole for receiving a sample to be microwave-heated, and an inductive tuning post all on a straight line, wherein the hole is adjacent the waveguide and the post is distant from the waveguide.

12 Claims, 5 Drawing Sheets

SYSTEM FOR MICROWAVE ENHANCED CHEMISTRY

FIELD OF THE INVENTION

The present invention relates to microwave systems, and more particularly microwave systems for accelerating reactions in small reagent volumes.

BACKGROUND OF THE INVENTION

The invention includes a variable output power microwave generator and a broadly tuned microwave applicator that is connected to the generator though a length of coaxial cable.

Many chemical reactions are greatly accelerated by heating with a microwave field as compared to an open flame, oven or oil bath. Systems for microwave chemistry that are available from several manufacturers have the limitations of physical size, limited to reagent volumes greater than a few milliliters, require retuning of the applicator when the reagent mix is changed, and limit the users ability to monitor the progress of the accelerated reaction.

U.S. Pat. No. 4,681,740, Apparatus for the Chemical Reaction by Wet Process of Various Products illustrates a length of waveguide that is terminated with end panels made from a conductive material with the magnetron oscillator placed near at one end of the cavity and a provisions to place to insert samples near the other end of the cavity. The waveguide is provided with tuning screws to adjust the tuning of the cavity to the requirements of the sample.

Systems such as these are generally suitable for performing reaction on relatively large volumes of chemicals. However the combination of the magnetron with its required cooling system, the sample holder, and the overall packaging make them excessively large for many laboratory applications.

U.S. Pat. No. 5,308,944 illustrates a cavity applicator that can be coupled to a microwave generator either by waveguide or coaxial cable. The geometry of this cavity is varied by sliding walls proportionately to adjust for the sample container and sample volume.

The paper, "Evaluation of a Microwave Cavity for the Synthesis of PET Radio Pharmaceuticals"; C. S. Dence et al; Journal of Labeling Compounds for Radiopharmaceuticals, 1995, #37, page 115. shows a microwave power oscillator with fixed output power connected to a tunable circular cavity.

DISCLOSURE OF THE INVENTION

One aspect of the present invention is predicated on the observation that the energy imparted to a sample in a microwave system, and for heating that sample, can be affected by the presence of an inductive tuning post placed within a waveguide of that microwave system. A second aspect is predicated on the observation that microwave systems made for chemical reagent heating generating irregular average power from one sample heating to the next receive little demand from consumers of microwave systems.

It is an object of the present invention to provide a microwave system capable of complete distillation of a small reagent sample. It is a second object of the invention to provide a variable power microwave generator with only one transformer for both high voltage and filament pre-heat.

According to the present invention, a microwave generator includes a variable voltage provided from a first transformer to a second transformer having a secondary winding split into a filament winding cathode low AC signal and a secondary winding providing a high voltage which is doubled and rectified in a half-wave voltage doubler for providing a pulsed DC signal through a ballast resistor to a magnetron anode which is responsive to an electromagentic field. In further accord with the present invention, the variable voltage is provided from a bucking transformer secondary winding In still further accord with the present invention, the bucking transformer output variable voltage is provided in response to signals from a thyristor controller, which is itself responsive to commands from a microcontroller. In still further accord with the present invention, the electromagnetic field strength and direction is selectable by outputs from the microcontroller. In still further accord with the present invention, the low AC signal from the filament winding is for bringing the filament cathode to a selectable temperature prior to beginning timing cycle when the filament begins to boil off electrons in a magnetic field created by an electromagnet for producing microwaves from an antenna connected to a cathode plate of the magnetron. The ballast resistor maintains a nearly constant current by compensating for fluctuations in alternating-current powerline voltage by increasing resistance when current increases. The ballast resistor is a means for stabilizing the pulse to pulse magnetron operation at low filament voltage and high standing wave ratio.

The "bucking" transformer works by taking the secondary winding and putting it in series but out of phase with the primary of the main transformer. What happens is that the net voltage applied to the high voltage main transformer is reduced, and therefore the output voltage of the high voltage main transformer and hence the magnetron anode is reduced.

In still further accord with the present invention, a microwave sample cavity includes a waveguide, and a hole for receiving a sample to be microwave-heated, and an inductive tuning post all on a straight line, wherein the hole is adjacent the waveguide and the post is distant from the waveguide.

In still further accord with the present invention, the cavity receives the microwaves from the microwave generator for heating a sample to a selectable temperature for a selectable time.

An advantage of this arrangement is more complete distillation of the sample. The invention includes a variable power microwave generator that is capable of withstanding a high SWR, a coaxial transmission line, and a fixed tuned cavity of intentionally lowered Q and increased bandwidth, the lowered Q being obtained by the choice of materials from which the cavity is made, by leaving a rough surface finish, by the insertion of inductive tuning posts into the cavity at positions adjacent to the inserted sample, and further by the introduction of a dielectric lens into the cavity to increase the focusing on the sample.

Further advantages include, in a microwave system, having a magnetron and an electromagnet but reduced filament voltage and reduced high voltage which is also smoothed because the ballast resistor gives the tube some slack to work against when it misfires. A second advantage of the present invention is that the presence of the ballast resistor allows an increased filament tube voltage.

The foregoing and other objects, features and advantages of the present invention will become more apparent in light of the following detailed description and accompanying drawings.

BEST MODE FOR CARRYING OUT THE INVENTION

Figure 1:
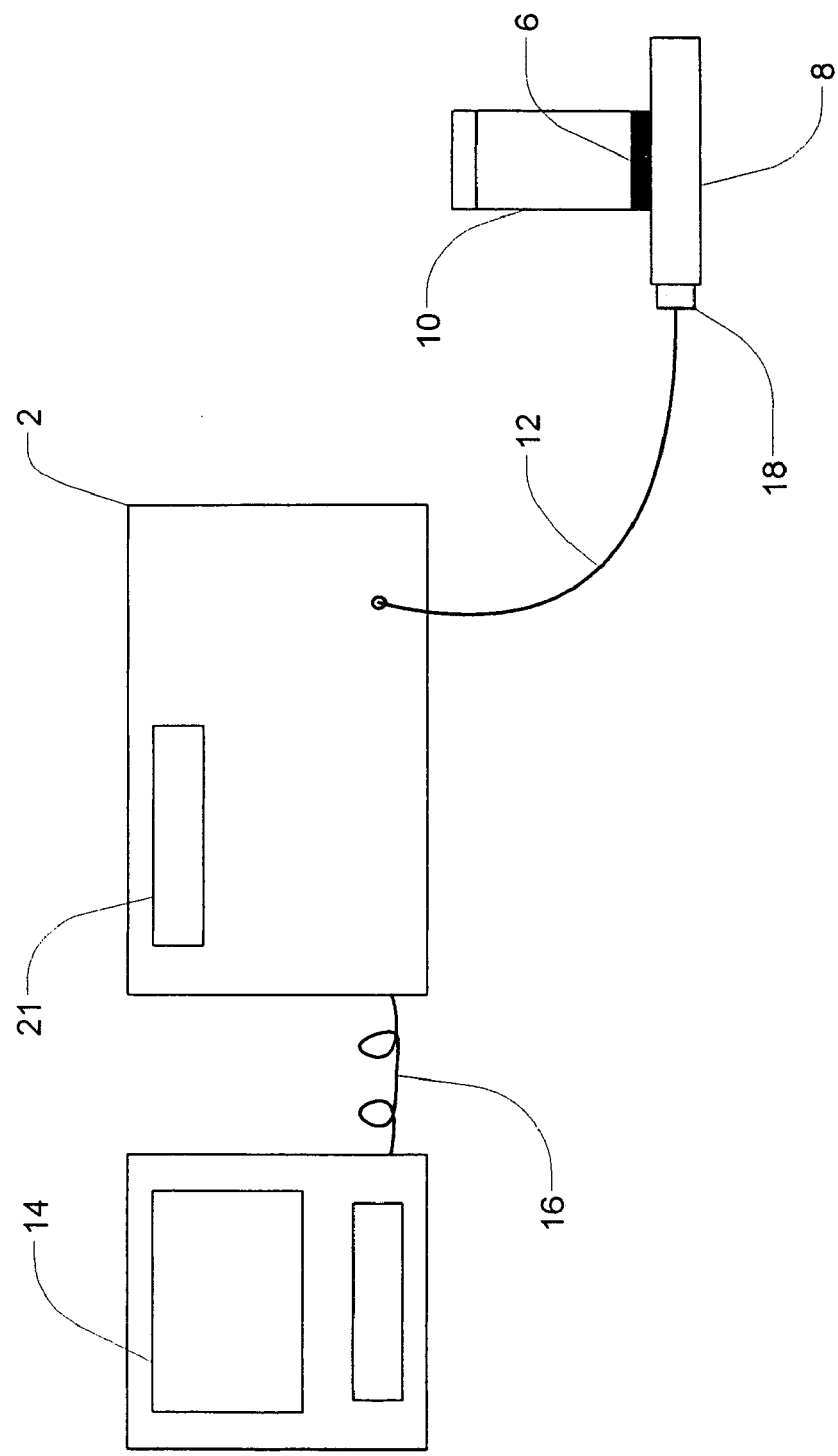
FIG. 1 illustrates a microwave system.
Figure 3:
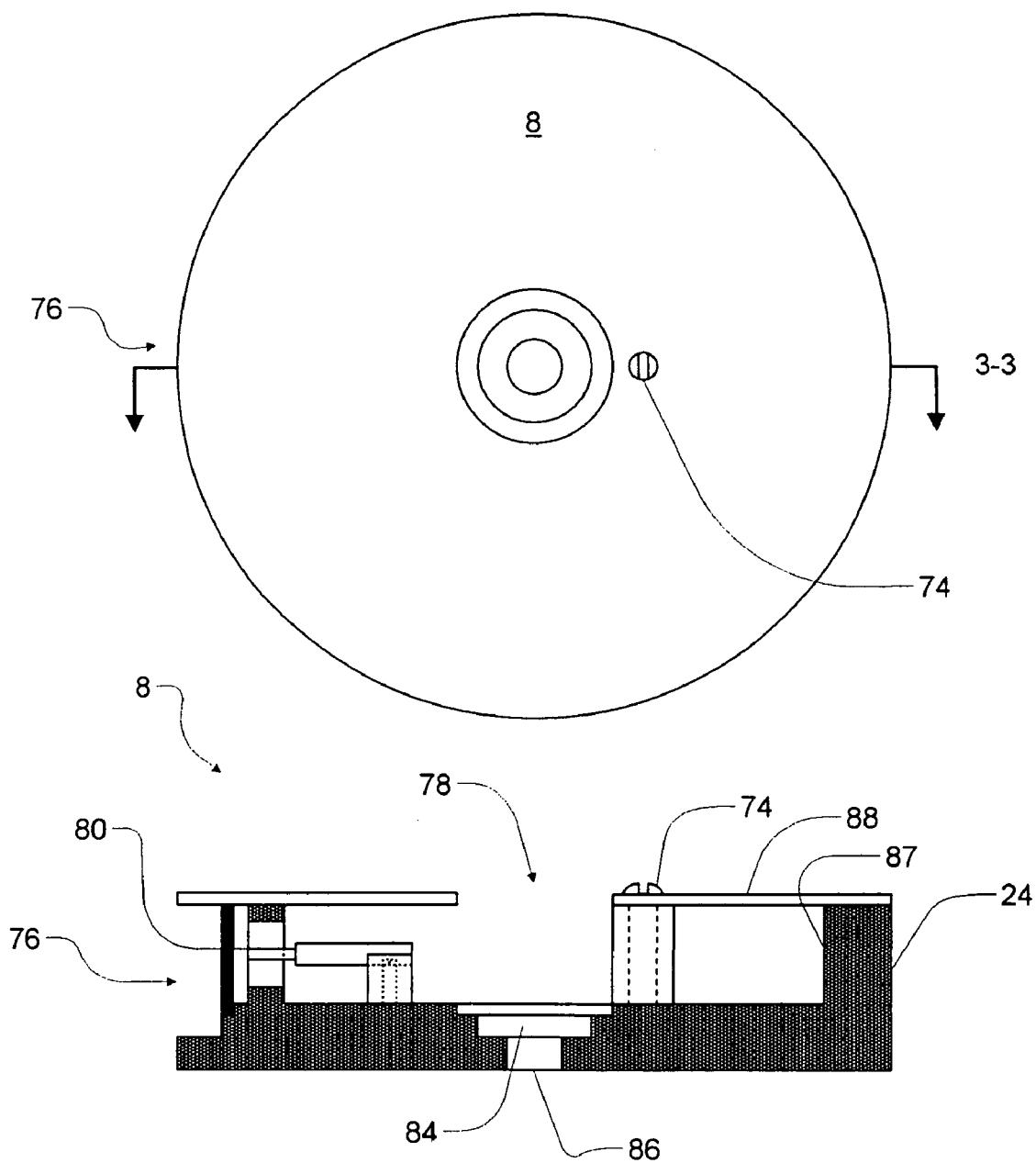
FIG. 3 is a top and side cross sectional view of a microwave cavity applicator with one inductive tuning post.

In FIG. 1, a microwave power generator 2 has a display of microwave system parameters 4 concerning microwave heating of a sample 6 in a microwave applicator cavity 8, reagent container 10, via interconnecting coaxial cable 12. The heating can be effected and monitored the reaction process at computer 14, through serial cable 16 between the computer 14 and the generator 2. The antenna 18, a probe or loop connected to the anode and extending into one of the tuned cavities, is coupled to the waveguide 8 into which it transmits the RF energy. Previously, the waveguide used was a rectangular channel made of sheet metal having reflective walls to allow transmission of microwaves from a magnetron (not shown) within a generator to microwave cavity; minimum frequency which can be propagated is related to rectangular cross section; energy should be reflected off walls and travel through waveguide into load and not reflected back into magnetron, damaging it. According to the present invention, a flexible coaxial cable 12 is used instead to connect the antenna 18 to a circular cavity 8 as shown in FIG. 3.

Figure 2:
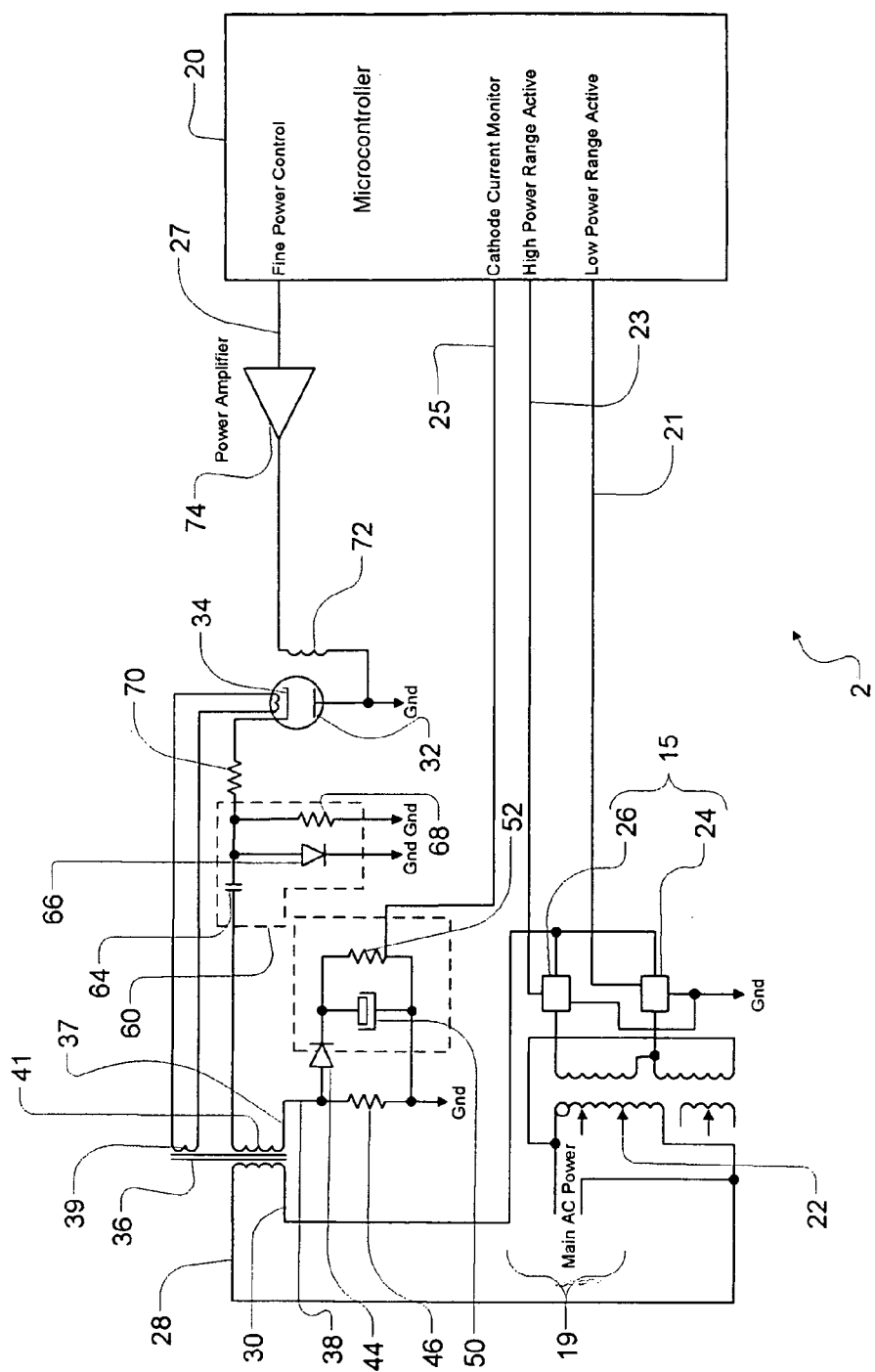
FIG. 2 is a schematic of a microwave signal generator.

In FIG. 2, a microwave power generator 2 includes a microcontroller 20 that has four principal ports: a) a low power output, b) a high power output, c) a cathode current monitor and d) a fine electromagnetic power control for transceiving on lines 23, 23, 25, 27. The low and high power signals provide coarse voltage control of bucking transformer 22. They do this because each of the low and high signals gates thyristors 24, 26, respectively. Bucking transformer 22 is responsive to an input AC voltage. The "bucking" transformer 22 works by taking a secondary winding of a transformer and putting it in series but out of phase with a primary winding of that transformer 22. What happens is that the net voltage applied to a second transfomer 36 is reduced as compared with what it would be if a non-bucking transformer were used in place of bucking transformer 22. Therefore, the output voltage of the second transformer which is applied to a magnetron anode is reduced. The thyristors 24, 26 control the conversion of that input AC voltage 19 provided bucking transformer 22 into another voltage provides across lines 28, 30 to a second transformer 36. Because the voltage across lines 28, 30 is variable in response to dicated commands from the microcontroller 20, that voltage across lines 28, 30 is called a variable voltage.

That gating of the thyristors 24, 26 provides coarse control over a pulsed DC voltage seen by the anode 32 of magnetron 34. The voltage across lines 28, 30 is provided to a high voltage system. The high voltage system is comprised of the secondary winding of the second transformer 36, a half-wave voltage doubler, and a ballast resistor. The purpose of the high-voltage system is to generate microwave energy by stepping up AC voltage from the secondary winding of transformer 60 to a higher voltage, thereby changing a high AC voltage to an even higher DC voltage, and then converts the DC power to RF energy. Microcontroller 8 also provides a low power range active signal on a line 21 to a thryistor 24 for gating AC voltage through bucking transformer 22. Microcontroller 20 provides a high power active signal on a line 25 to the gate of a thyristor 26 for gating more AC line voltage through bucking transformer 22.

High voltage transformer 36 at its secondary winding is monitored at one end 37 on line 38 by a cathode current monitor circuit 40. The cathode current monitor circuit 40 is itself connected to a cathode current monitor port on line 25 of microcontroller 20. The end 37 of bucking transformer 22 is connected to an anode of a diode 44 in the cathode monitor converter circuit 40 and a resistor 46. The cathode of the diode 44 is connected to a resistor-capacitor circuit having an electrolytic capacitor 50 in parallel with a resistor 52. Microcontroller 20 monitors bucking transformer 22 by line 25 to resistor 52 in the cathode current monitor circuit 40.

The second transformer 36 is responsive to voltage provided to its primary winding from the bucking transformer 22. Most microwave systems have a transformer for providing pulsed DC to a magnetron anode, and an additional filament transformer for providing an AC signal to the filament cathode of a magnetron for preheating that filament cathode. The present invention provides instead a single transformer 36 which achieves both purposes. This is done by a single transformer 36 with a single primary winding but a split secondary winding of transformer 36—split into two sub-windings. One of these two sub-windings functions as the filament winding 39 for providing AC to the magnetron filament cathode and the other as the high voltage winding 41 (for providing pulsed DC to the magnetron anode).

Subwinding 41 of second transformer 36 is connected to a half-wave voltage doubler circuit 60. The circuit of FIG. 2 serves a continuous wave magnetron 34 designed to energized by pulsed DC to produce a high frequency microwave energy coupled to a waveguide by means of antenna 18. The cathode of the magnetron is at high voltage relative to the anode which is at ground potential. The half wave voltage doubler includes a charging capacitor 64 and a return path rectifying diode 66. The magnetron 34 is energized by only half cycles of voltage, the alternate cycles being ineffective due to the diode action of the rectifying diode 66, the current passing through the rectifying diode 66 on these alternate half cycles.

Half-wave voltage doubler circuit 60 includes a capacitor 64 connected to both a cathode of a diode 66 and a resistor 68. The half-wave voltage doubler circuit 60 doubles the voltage across bucking transformer 22 which is presented to it on line 68 and presents a pulsed DC signal to the anode of magnetron 34. This pulsed DC high power signal is not passed directly to the magnetron 34 but rather through a ballast resistor 70. A ballast resistor 70 is placed in series between the half-wave voltage doubler and the anode 32 of magnetron 34. The addition of this resistor 70 reduces the cycle to cycle instability otherwise encountered when the magnetron 34 is operated at reduced filament cathode voltage and a high voltage standing wave ratio. A value of 1500 ohms was established for the ballast resistor 70 production purposes.

The ballast resistor 70 maintains a nearly constant current by compensating for fluctuations in alternating-current powerline voltage by increasing resistance when current increases. Without the ballast resistor 70 large variations would result in the power contained in the pulsed DC signal. These variations would principally show up in the average power required for heating a sample 6. The result is that from one sample 6 to the next sample 6 a user of the present invention would notice that different lengths of time for heating would be required. Since most scientific progress depends on standardization of tasks such ask heating, the lack of the ballast resistor 70 leads to a microwave system that has no practical use to the researcher.

The filament winding 39 of the secondary of transformer 36 is connected to filament cathode of the magnetron 34 which applies a low voltage to the filament cathode which in turn causes it to heat up (filament voltage is usually 3 to 4 VAC). The temperature rise causes increased molecular activity within the filament cathode to the extent that it begins to "boil" off or emit electrons. Electrons leaving the surface of a heated filament wire like molecules leaving the surface of boiling water in the form of steam. The electrons, however, do not evaporate. They float just off the surface of the cathode, waiting for some momentum provided by the negative high voltage DC, which is produced by means of the high-voltage transformer and the doubler action of the diode and capacitor. A negative 4000-volt potential on the cathode puts a corresponding positive high potential on the anode. The electrons leave the vicinity of the cathode and accelerate straight toward the positive anode 32 and encounter an powerful magnetic field provided by electromagnet 72, which is itself responsive to a fine power control signal from microcontroller 20 through a power amplifier 74. The resulting microwave is transferred by an antenna 18 to a coaxial cable 78 for communication to the sample 6 held in cavity 8 shown in FIGS. 1, 3. While coarse power control is provided by the thyristor controller 15, fine power control is provided by electromagnet 72. Electromagnet 72 is available from Richardson. It has two poles—one is a permanent magnet and the other pole is an electromagnetic winding. The combination is electromagnet 72. The magnetron 34 with electromagnet 72 can be bought from Richardson Electronics in LaFox, Ill.

Because such power supplies are intended for magnetron output powers in excess of 500 watts the output voltage from the supply is reduced by placing the output voltage from a low voltage transformer, bucking transformer 22, in series with the primary of a high voltage transformer 36.

The power control cycle provides for a six to eight second preheating of the magnetron with the high voltage set at the lower of the two power ranges and with no current in the electromagnet of magnetron 34. After the pre-heat interval the high voltage and electromagnet current are set according to the output power set by the user and continued at the setting until the end of the power cycle.

Practical power outputs in the range of 5 to 300 watts may be set for any desired time interval. It is also possible to provide for negative feedback control of temperature and pressure at the sample container. The input current to the magnetron's beam supply is monitored by a sampling resistor 52 that is placed into the grounded end of the high voltage transformer secondary. The forward and reflected powers inside the waveguide transition that couples the magnetron 34 to the coaxial cable 2 are sampled by a coupling loop inserted into the waveguide and detected by pair of hot carrier diodes (not shown).

Thus the a) cathode current, b) forward power, and c) the standing wave ratio are displayed on a front panel and are available for remote monitoring through an RS232 serial port.

FIGS. 3A and 3B are top and side cross-sectional views along lines 3-3, respectively. They show a circular disc-shaped applicator cavity 8 and a single inductive tuning post 74 for affecting microwaves coming from direction 76 on the other side of hole 78 from the post 74. The cavity 8 includes a loop 80 for the coupling to a microwave field emitted from the antenna of the magnetron 34. Cavity 8 includes an opening 78 in the top cover to admit a reagent vial 6, and a recess 84 in the bottom of the cavity 8 which acts as the seat for a bottom of the reagent vial 6. Cavity 8 also includes a hole 86 in the bottom of the cavity 8 by which the reagent container 6 may be weighed or monitored for changes in its color or light absorption. The top cover 88 is anchored to the reagent container by the inductive tuning post 74. The cavity is sized to accommodate about 2 milliliters of liquid in the microwave field. The diameter of the cavity 8 is related to the wavelength of the microwave field, in a known manner, within the disc-shaped cavity 8 which is walled 87.

In FIGS. 4A & B, top and cross-sectional views of cavity 8 are shown wherein the cavity includes a a dielectric lens 89 to the cavity in FIG. 3. Dielectric 89 lens is doughnut-shaped for mounting it concentrically and surrounding with the reagent vial 6. The reagent vial 6 can he seated within a hole of the doughnut-shaped dielectric 28. The lens 89 may be made of any material with a low loss tangent at microwave frequencies. Commercial materials such as Teflon or Stycast have a controlled dielectric constant and do not absorb moisture from the atmosphere. The addition of this lens improves the ability of the applicator to couple power to sample volumes of 250 microliters or less. When such a lens is added to the cavity applicator the diameter of the cavity must be reduced according to the dielectric constant of the material, in a known manner.

The present invention allows the operator to separately position controls from the sample chamber. Sometimes this is done for convenience. Further, where reagents are radio-labeled, the sample cavity can be placed behind a lead shield, for example, while still connected by means of the cable. This protects the researcher.

The cavity design 8 is such that the sample vial 10 rests in a position optimized to the electric field of the cavity 8. This substantially lowers the power required to heat milliliter-volume reagents.

Power may be set from 20 to 200 Watts and time from 1 to 600 seconds. Power requirements are 118 VAC at 8 Amps. The sample cavity is single mode TE.

Figure 4:
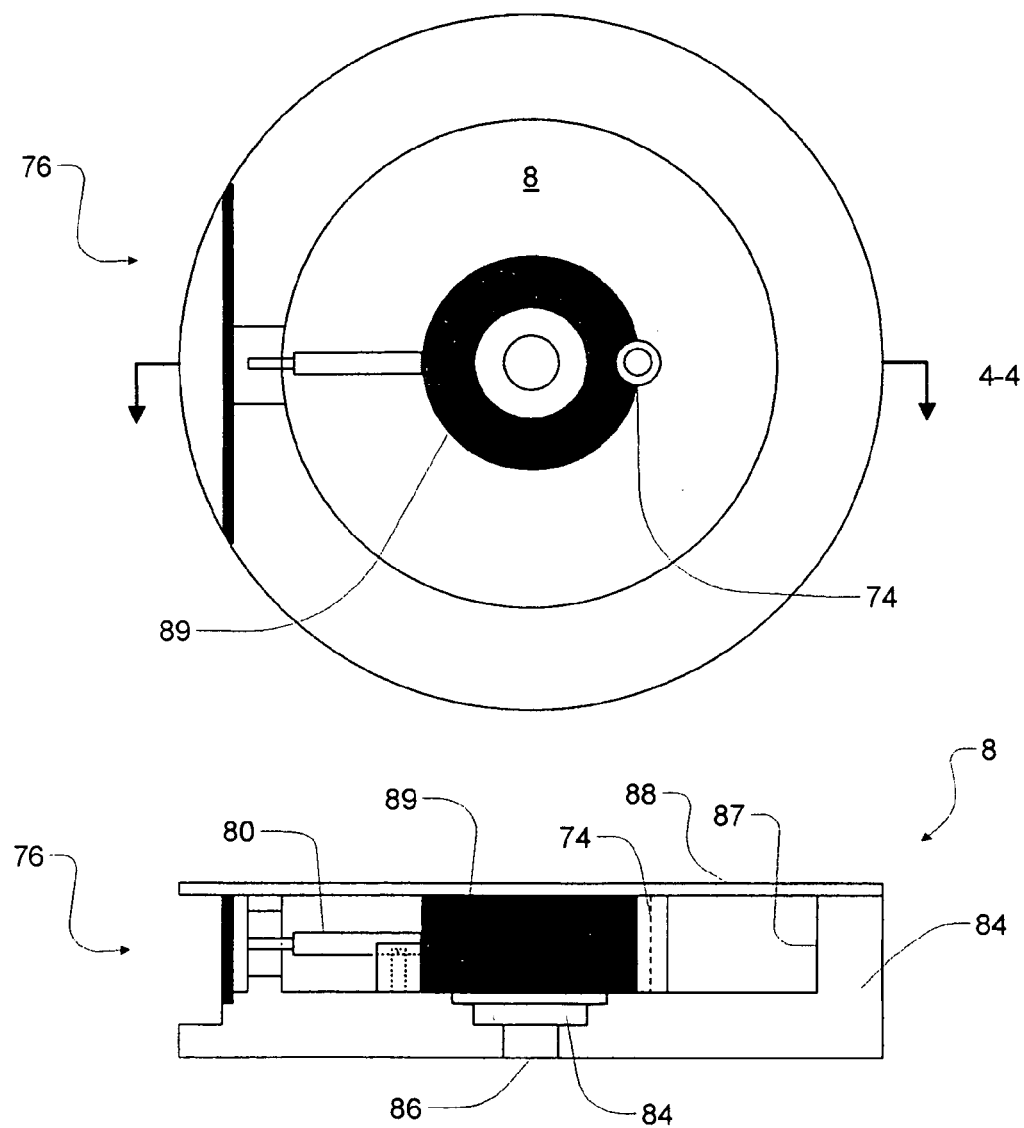
FIG. 4 is a top and side cross sectional view of a microwave cavity applicator with one inductive tuning post and a dielectric insert.
Figure 5:
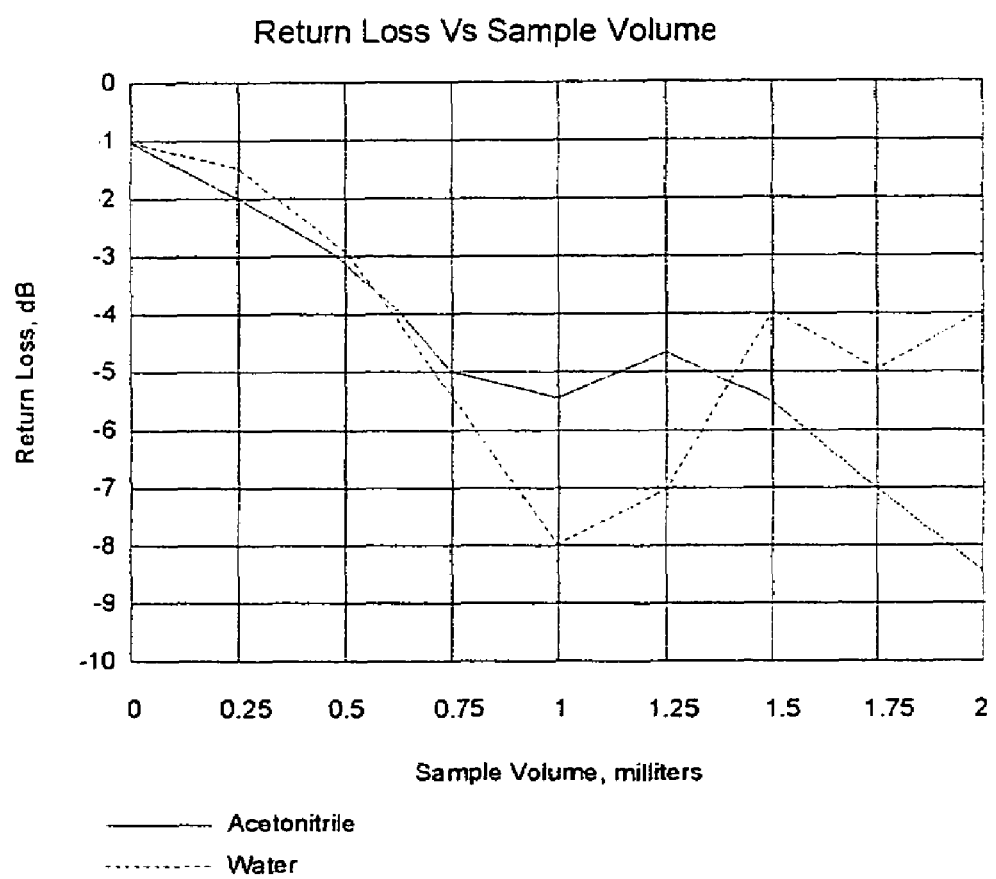
FIG. 5 is a graph of return loss versus sample volume.

FIG. 5 is a graph of return loss versus sample volume for demonstrating the ability of the applicator to couple power to a wide range of reagent volumes. The reagents used were acetonitrile and distilled water. Tests were performed at 2450 MHz with the reagents in a 5 mL Wheton vial with a conical bottom and an applicator cavity with a fixed inductive post as shown in FIGS. 3 and 4.

Although the invention has been shown and described with respect to a best mode embodiment thereof, it should be understood by those skilled in the art that various other changes, omissions and additions in the form and detail thereof may be made therein without departing from the spirit and scope of the invention.

The invention claimed is:

1. A microwave system, comprising:
   an electromagnet for providing a magnetic field;
   a magnetron having a cathode, an antenna, and an anode within and responsive to said magnetic field;
   a first transformer for providing a variable voltage,
   a second transformer having a primary winding responsive to said variable voltage and having a secondary winding split into a filament winding for providing a low AC signal to said cathode and a secondary winding for providing a high AC voltage a half-wave voltage doubler responsive to said high AC voltage for doubling and rectifying said high AC voltage and providing a pulsed DC signal;
   a ballast resistor, for maintaining nearly constant current and compensating for fluctuation in AC voltage in response to current increases, said ballast means being responsive to said pulsed DC signal and electrically dispose intermediate said half-wave voltage doubler and said magnetron anode for providing said pulsed DC signal to said magnetron anode where said magnetron is responsive to said magnetic field, pulsed DC signal, and AC signal provided to said cathode for emitting RF energy, wherein said ballast resistor connected between said half-wave voltage doubler and said magnetron anode;

a microwave applicator, including a circular disc-shaped waveguide, having a top and a bottom, said circular waveguide being responsive to microwave signals from a microwave generator provided to said waveguide at an inlet at the outer edge of said circular waveguide for communicating said microwave signals through said waveguide;

an inductive tuning post fixed in said circular waveguide, oriented parallel to the electric field to provide additional inductive susceptance in parallel with the waveguide;

a depression on the top of said circular waveguide, and between said post and said inlet, said depression for receiving a sample.

2. The microwave system of claim 1, wherein said first transformer is a bucking transformer.

3. The microwave system of claim 2, further including a controller for controlling the amount of voltage from said line voltage that is passed through said first transformer, whereby said controller selects discrete voltage levels of voltage output to said second transformer.

4. The microwave system of claim 1, wherein said first transformer is a bucking transformer responsive to a first AC line voltage signal for a) providing a second AC voltage signal.

5. The microwave system of claim 1, further including a controller for controlling the amount of voltage from said line voltage that is passed through said first transformer.

6. The microwave system of claim 1, further including a controller for controlling the amount of voltage from said line voltage that is passed through said first transformer wherein said controller is comprised of 2 or more thyristors, each connected to a part of said first transformer, each thyristor having a gate such that when said gate is turned on, voltage is from said line source passes through said first transformer to said second transformer.

7. The microwave system of claim 1 wherein said magnetic field provided by said electromagnet is selectable.

8. The microwave system of claim 1 wherein the current supplied to said magnetron is monitored.

9. The microwave system of claim 1 wherein the current supplied to said magnetron cathode is monitored for providing negative feedback control of power supplied to said magnetron and changing the strength of said electromagnetic field is response to said current supplied to said magnetron cathode.

10. The microwave system of claim 1 wherein said inlet, depression and post all lie on a substantially straight line on a plane parallel with the top and bottom of said circular disc-shaped waveguide.

11. The microwave system of claim 1 further including a second inductive tuning post which is not fixed but may be screwed into or out of the waveguide, said post being oriented parallel to the electric field so as to provide additional inductive susceptance in parallel with the waveguide.

12. The microwave system of claim 1 further including a dielectric lens.

* * * * *